Dec. 17, 1935.     H. K. KAPLAN     2,024,527
SCAFFOLD COUPLING AND CLAMP
Filed Oct. 4, 1933    2 Sheets-Sheet 1
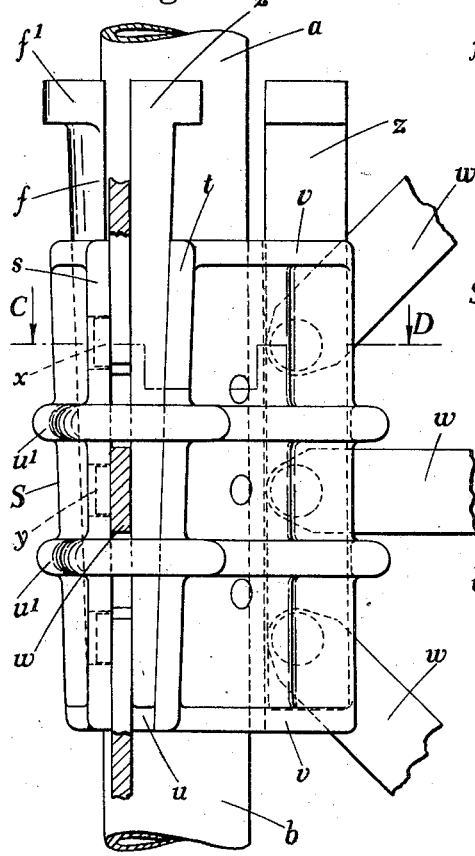
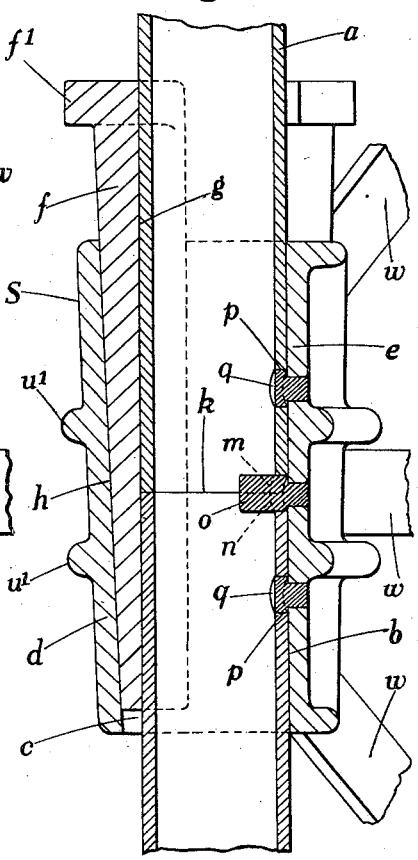
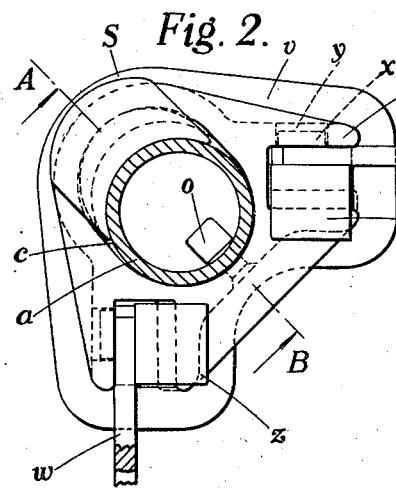
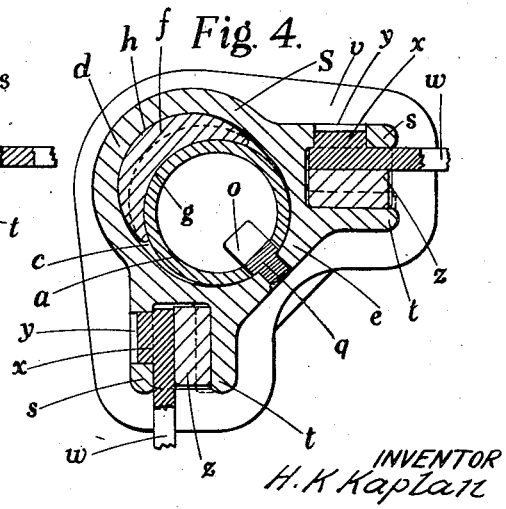
INVENTOR
H. K. Kaplan
BY
ATTORNEY Dec. 17, 1935.   H. K. KAPLAN   2,024,527
SCAFFOLD COUPLING AND CLAMP
Filed Oct. 4, 1933   2 Sheets-Sheet 2

INVENTOR
H. K. Kaplan
BY
ATTORNEY

Patented Dec. 17, 1935

2,024,527

UNITED STATES PATENT OFFICE 2,024,527

SCAFFOLD COUPLING AND CLAMP

Harry Kasse Kaplan, London, England

Application October 4, 1933, Serial No. 692,190
In Great Britain October 11, 1932

7 Claims. (Cl. 189—36)

This invention relates to scaffolding and staging as employed for the convenience of workmen and the conveyance of materials in the erection of buildings and to other temporary structures, for instance, towers for cranes and lifts, supports for platforms used for flood-lighting in cinematographic studios and other purposes.

The invention has for its main object to provide a construction which permits of the various parts being rapidly and easily assembled and dismantled, with due regard to the safety of the workmen and others, and relates more particularly to the joint or coupling members that are adapted to rigidly couple together suitable lengths of the tubular posts or standards and are provided with means for receiving and securing thereto the transverse members or putlogs and the braces.

A coupling constructed according to the present invention comprises a sleeve the bore of which is substantially elliptical and tapered so that one part of the sleeve wall is vertical and the part opposite thereto is inclined to the vertical whereby when two posts to be united are inserted in the said bore with the lower end of one post abutting the upper end of the other post on the median transverse plane of the coupling and with one portion of their outer peripheral surfaces in contact with the vertical wall, a tapered wedge of curved shape in cross section may be driven into the space between the other portion of the outer peripheral surfaces of the two posts and the inclined wall of the sleeve to rigidly lock the two posts in their coupled position.

The lower end of one post and the upper end of the other post are slotted so that when the said ends abut the slots engage a pin projecting from the vertical wall into the bore of the sleeves and holes in the walls of each post engage pins situated above and below the central pin. Moreover, two pairs of vertical flanges extend outwardly from the wall of the sleeve, one pair at right angles to the other pair, and one flange of each pair being vertical and the other flange inclined to the vertical so that tapered slots are formed between each pair of flanges for the reception of the transverse members, braces or putlogs. Means are provided for rigidly locking the braces in their required positions.

These and other features of the invention will be more clearly understood by reference to the accompanying drawings in which similar reference characters relate to the corresponding parts in all the figures and in which:—

Figure 1 shows the improved coupling in elevation and positioned to unite two posts or standards and with a pair of transverse braces and a horizontal brace connected thereto.

Figure 2 is a plan of Figure 1

Figure 3 a sectional elevation taken on the line A—B Figure 2

Figure 4 a cross-section on the line C—D Figure 1.

Figure 5:
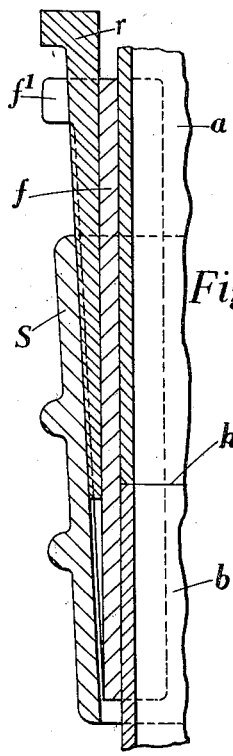
Figure 6:
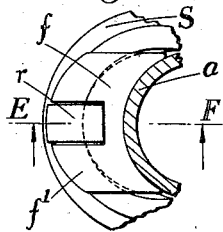

Figures 5 and 6 are views showing the provision of an additional wedge for securing the joint, Figure 6 being a plan view and Figure 5 a sectional elevation on the line E—F Figure 6.

Figure 7:
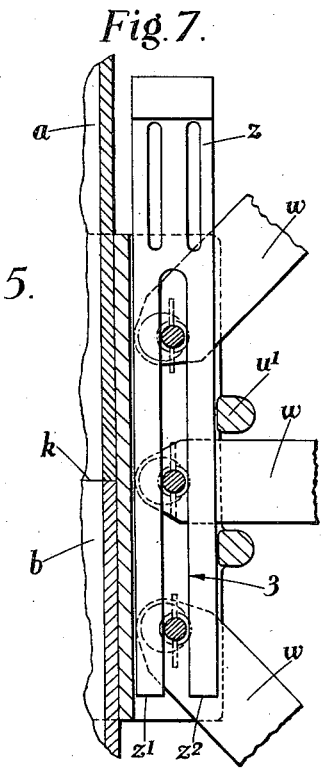
Figure 8:
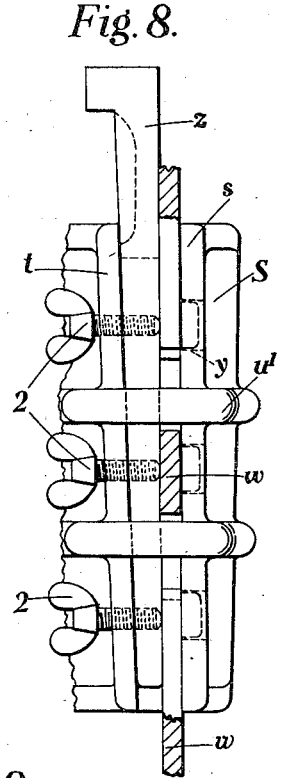
Figure 9:
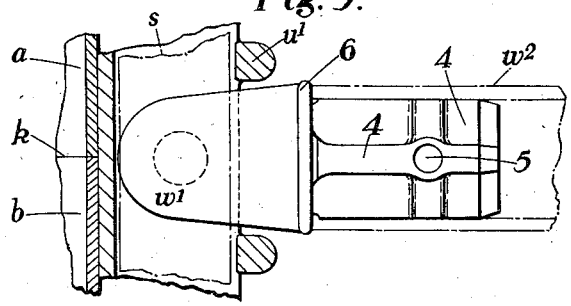
Figure 11:
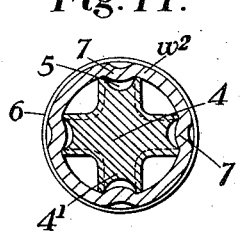
Figure 10:
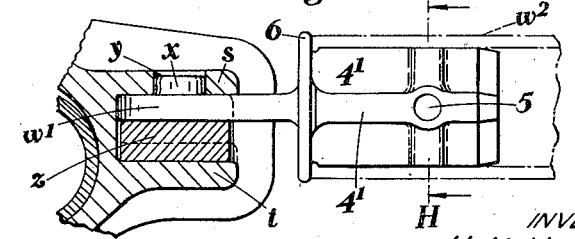

Figures 7 and 8 are partial elevations showing the wedge securing the transverse members in position, and Figures 9, 10 and 11 show a method of adapting flat or rectangular braces for the reception of a tubular transverse member or putlog, Figure 9 being a fragmentary view in elevation, Figure 10 a plan thereof and Figure 11 a cross-section on the line G—H of Figure 10.

Referring now to the drawings and particularly to Figures 1 to 4 thereof it will be seen that the coupling members generally designated by the reference letter S are of sleeve formation and will be hereinafter referred to as "sleeves" for the sake of convenience, the actual formation of each sleeve S being more readily apparent from the cross-section shown in Figure 4 and it will be seen that the bore of each sleeve which receives the two posts $a$ and $b$ to be coupled together thereby is not circular so that it closely engages the peripheral exterior surfaces of the tubes $a$, $b$, but is formed as a substantially elliptical and tapered slot $c$ so that the part $e$ of the sleeve wall is vertical and the part $d$ opposite thereto is inclined to the vertical.

The posts $a$ and $b$ but at $k$ on the medial transverse plane of the coupling and one portion of their outer peripherial surfaces is in contact with the wall $e$. The space between the other portion of the outer peripheral surfaces of the posts $a$ and $b$ and the wall $d$ is utilized for the reception of the wedge $f$ provided with the upper flange $f'$ and which is of curved formation in cross section so that its inner surface $g$ closely embraces the outer peripheral surfaces of the tubes $a$ and $b$ and its outer surface $h$ is in contact with the wall $d$.

The lower end of the post $a$ and the upper end of the post $b$ are provided with semi-circular slots $m$ and $n$ which embrace a pin $o$ projecting from the wall $e$ of the sleeve into the bore thereof and holes $p$ in the walls of the posts $a$ and $b$ disposed respectively above and below the slots m and n as shown engage pins q projecting from the walls e above and below the central pin o. When thus disposed the united tubes a and b are rigidly locked in position by the tapered wedge f.

In the event of the wedges f becoming worn by use, additional wedges r of rectangular section may be employed as shown in Figures 5 and 6, the flange f' of each wedge f being slotted to enable the wedge r to be driven therethrough in rear of and in engagement with the rear surface of the wedge f.

For attachment of putlogs or transverse members and braces the sleeves S are formed with two pairs of longitudinal flanges s and t which extend outwardly from the walls of each of the sleeves the whole depth thereof. The flanges t are tapered so that tapered slots u are formed between each pair of flanges s and t and one pair of flanges is at right angles to the other pair so that the braces w for example attached to one pair of flanges are at right angles to the braces w attached to the other pair as generally required by the rectangular formation of the structure.

Strengthening ribs u' encircling the sleeves S divide the vertical slots u into central slots and upper and lower slots and the upper and lower ends of the sleeves are further strengthened by the flanges v. The braces w are formed with flattened ends on which are mounted studs x that engage the holes y in the flanges s and are locked in this position by means of the forked wedges z that are driven into the tapered slots u between the ends of the braces w and the inclined flanges t thereby rigidly locking the braces w in their required position.

As an additional precaution tapped holes are provided in the flanges t opposite to the holes y on the flanges s for the reception of the wingheaded set screws 2 the ends of which bear against the braces w, the shanks of the screws 2 passing through the slots 3 formed between the prongs z' and z² of the forked wedges z (Figures 7 and 8).

In Figures 9, 10 and 11 is illustrated an alternative construction whereby the flat ends w' of the braces w may be adapted for the reception of tubular transverse braces or putlogs w². As shown, these flattened ends w' carry an attaching member 4 which is of cruciform cross-section and each of the projecting wings 4' thereof is provided with a circular recess or depression 5.

The tubular transverse member or putlog w² is passed over the attaching member 4 to abut against the circular flange 6 at the outer end of the bar w' and is secured in position by punching the tubular wall so that it engages the four recesses 5 on the attaching member 4 thereby upsetting the metal to form keys 7 and rigidly locking the two parts together.

What I claim is:—

1. A coupling for the meeting ends of standards designed to be aligned in abutting relation, said coupling comprising a sleeve freely movable longitudinally in both directions on the standtrds relative to the abutting ends, said sleeve having a bore extending vertically therethrough with one part of the wall of the bore concentric with the outer surfaces of the standards and in contact throughout with said standards when the coupling is applied, the remaining portion of the bore forming a line continuation of the concentric portion with its margin spaced at all points from the surface of the standards with such spacing gradually decreasing downwardly to thereby provide a wedge-receiving space of a transverse dimension to permit the ends of the standards to be moved thereinto for convenience in assembling, and a wedge-shaped element arranged in the wedge-shaped portion of the bore beyond the standards, said element having an inner curved surface to accurately conform to and engage the exterior surface of the abutting ends of the standards through approximately one-half the circumferential length of the standards, the outer surface of the wedge-shaped element conforming to the inclined surface of the wedge-shaped portion of the bore for wedging purposes, whereby in applied position the abutting ends of the standards are engaged throughout substantially one-half their circumferential lengths by the wall of the bore and engaged throughout substantially the remaining one-half of their circumferential lengths by the inner surface of the wedge-shaped element.

2. A coupling for the abutting ends of aligned standards employed in the construction of scaffolding and the like, comprising a sleeve having a tapered bore with one wall vertical and the remaining wall inclined to the vertical, the vertical wall directly contacting throughout its length with the surfaces of the included standards, and a wedge-shoped element to be inserted between the included standards and the inclined wall, the inner surface of the element providing a substantially vertical surface conforming to and in direct contact with the surfaces of the included standards, the opposite surfaces of the wedge conforming to the curvature and inclination of the inclined wall of the sleeve, whereby the interior diameter of the sleeve is normally in excess of the diameter of the included standards to provide for easy introduction of the standards and whereby said included standards, following the application of the wedge, are substantially gripped throughout their full vertical lengths within the sleeve and maintained in exact vertical alignment, the sleeve being provided with a plurality of elements for interengagement with the included portions of the posts following the use of the wedge.

3. A construction as defined in claim 2, wherein the sleeve is provided with an element interfitting with the meeting ends of the included posts and limiting the posts in their introduction into the sleeve.

4. A construction as defined in claim 2, wherein the sleeve is provided with longitudinally ranging channels, the planes of which are at right angles to each other and which channels are open on one longitudinal side and at the top and bottom.

5. A construction as defined in claim 2, wherein the sleeve is provided with vertically ranging channels to receive the cooperating bracing elements of the structure, each of the channels including a vertical wall and an inclined wall with a locking wedge cooperating with the inclined wall.

6. A construction as defined in claim 2, wherein the sleeve is provided with longitudinally ranging channels disposed at right angles to each other, each channel including a vertical wall formed to interfit with a bracing member and an inclined wall spaced from the bracing member when applied, together with a wedge cooperating with the inclined wall and cooperating with and maintaining the bracing member in contact with the vertical wall.

7. A construction as defined in claim 2, wherein the sleeve is provided with longitudinally ranging channels, each including a vertical wall and an inclined wall, the vertical wall being formed with an opening to cooperate with a complementary part on a bracing member, the inclined wall being spaced from the bracing member when applied, and a wedge to maintain the complementary part of the bracing member within the opening in the vertical wall.

HARRY KASSE KAPLAN.